(12) United States Patent
Bunney et al.

(10) Patent No.: US 10,555,066 B1
(45) Date of Patent: Feb. 4, 2020

(54) DETECTION OF HEADPHONE ROTATION

(71) Applicant: Apple Inc., Cupertino, CA (US)

(72) Inventors: Brooke L. Bunney, Mountain View, CA (US); Jonathan R. Peterson, Woodinville, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/105,882

(22) Filed: Aug. 20, 2018

Related U.S. Application Data

(60) Provisional application No. 62/562,291, filed on Sep. 22, 2017.

(51) Int. Cl.
*H04R 1/10* (2006.01)
*G06F 3/16* (2006.01)

(52) U.S. Cl.
CPC .......... *H04R 1/1041* (2013.01); *G06F 3/165* (2013.01); *H04R 1/105* (2013.01); *H04R 1/1008* (2013.01); *H04R 2420/07* (2013.01)

(58) Field of Classification Search
USPC ........ 381/74, 71.6, 151, 309, 362, 367, 370, 381/376
See application file for complete search history.

(56) References Cited

U.S. PATENT DOCUMENTS

| | | | |
|---|---|---|---|
| 9,049,508 B2 | 6/2015 | Puskarich | |
| 9,113,246 B2 | 8/2015 | Bastide et al. | |
| 9,445,172 B2 | 9/2016 | Pong et al. | |
| 9,538,302 B2 | 1/2017 | Turgul | |
| 2010/0058251 A1 | 3/2010 | Rottler et al. | |
| 2012/0114132 A1 | 5/2012 | Abrahamsson et al. | |
| 2013/0279724 A1* | 10/2013 | Stafford | H04R 1/1041 381/309 |
| 2014/0086438 A1 | 3/2014 | Tachibana et al. | |
| 2014/0254817 A1* | 9/2014 | Vilermo | H04R 1/32 381/74 |
| 2016/0198251 A1 | 7/2016 | Pan | |
| 2016/0216943 A1* | 7/2016 | Welti | G06F 1/163 |
| 2016/0381451 A1 | 12/2016 | Pong et al. | |
| 2017/0026735 A1 | 1/2017 | Li et al. | |
| 2017/0094411 A1 | 3/2017 | Peterson et al. | |

OTHER PUBLICATIONS

Non-Final Office Action for U.S. Appl. No. 16/100,069 dated Oct. 5, 2018, 17 pages.

* cited by examiner

*Primary Examiner* — Yosef K Laekemariam
(74) *Attorney, Agent, or Firm* — Kilpatrick Townsend & Stockton LLP

(57) ABSTRACT

Some embodiments of the disclosure provide systems and methods of detecting headphone rotation to properly process user input to the headphones. The systems and methods described herein may be used, for example, to detect a gesture (e.g., a swipe) received as user input on a touch interface of the headphones, such as a touch interface integrated into an ear piece. The gesture may be made in a particular direction, such as down toward Earth. However, headphones may be worn in a plurality of configurations, such as upright with the headband around the top of the head, downward with the headband around the back of the neck, or anywhere in between. Thus, the systems and methods described herein may be used to determine the rotation of the headphones in order to properly ascertain the intended gesture and perform an intended result.

19 Claims, 8 Drawing Sheets

DETECTION OF HEADPHONE ROTATION

CROSS-REFERENCES TO RELATED APPLICATIONS

This application claims the benefit of U.S. Provisional Application No. 62/562,291, filed Sep. 22, 2017, entitled "DETECTION OF HEADPHONE ROTATION." The disclosure of this application is incorporated by reference herein in its entirety.

FIELD

The present disclosure relates generally to headphones, and more specifically, to systems and methods for detecting headphone rotation.

BACKGROUND

Headphones may be used to transport an audio signal from a source device (e.g., a mobile device, an MP3 player, etc.) to a user's ears. In some instances, characteristics of the audio signal may be controlled, such as turning the audio signal on or off, pausing the audio signal, changing the audio signal (e.g., switching from one song to another song), rewinding the audio signal, fast forwarding the audio signal, adjusting volume of the audio signal, adjusting treble of the audio signal, adjusting bass of the audio signal, and/or the like. This control may typically be performed at the source device by the user using one or more input elements, such as buttons. In response, the audio signal may be transformed before it reaches the headphones.

SUMMARY

In an ecosystem of electronic products, it may be beneficial for a user to control the characteristics of an audio signal through a pair of headphones instead of a source device. For example, it may be easier for a user to adjust the volume of an audio signal directly on the headphones while they are being worn than to remove a source device, such as a mobile device, from a pocket or purse, then to interact with the source device to cause the transformation. Some headphones may allow for adjustment of the audio signal via one or more input elements (e.g., buttons) coupled to the wiring between the headphones and the source device. However, such wired input elements may become obstructive in different headphone orientations (e.g., with the headband around the neck). Further, wired input elements may not be desirable for wireless headphone implementations.

Some embodiments of the disclosure provide systems and methods of detecting headphone rotation to properly process user input to the headphones. The systems and methods described herein may be used, for example, to detect a gesture (e.g., a swipe) received as user input on a touch interface of the headphones, such as a touch interface integrated into an ear piece. The gesture may be made in a particular direction, such as down toward Earth. However, headphones may be worn in a plurality of configurations, such as upright with the headband around the top of the head, downward with the headband around the back of the neck, or anywhere in between. Thus, the systems and methods described herein may be used to determine the rotation of the headphones in order to properly ascertain the intended gesture and perform an intended result.

Some embodiments of the disclosure pertain to a pair of headphones that include first and second ear pieces connected by a headband. The first ear piece includes a first speaker and a touch interface disposed at an external surface of the first ear piece. The second ear piece includes a second speaker. The pair of headphones can further include control circuitry coupled to the one or more sensors and to the touch interface and configured to determine a rotation of the first ear piece relative to a user's ear based on sensor data. The control circuitry can be further configured to detect and determine a direction of a swipe gesture across the touch interface and to perform a predetermined function based on the direction of the swipe gesture and the rotation of the first ear piece relative to the user's ear.

In some embodiments, the control circuitry determines the rotation of the first ear piece relative to the user's ear based on an orientation of a pinna of the ear relative to the first ear piece. In some embodiments, the one or more sensors comprises a plurality of capacitive proximity sensors. In some embodiments, the plurality of capacitive proximity sensors are distributed across a surface of the first ear piece facing the user's ear. In some embodiments, the one or more sensors each include a sensor element that measures a distance between the user and the sensor element. In some embodiments, the one or more sensors comprises an optical sensor. In some embodiments, the one or more sensors comprises a structured light sensor.

A pair of headphones according to some embodiments includes first and second ear pieces and a headband that extends between the two ear pieces. The first ear piece can include a first speaker and a touch interface disposed at an external surface of the first ear piece. The second ear piece can include a second speaker and, in some instances, can include a second touch interface. The headphones can further include one or more sensors that generate sensor data and control circuitry coupled to the one or more sensors and to the touch interface. The sensor data can be used to determine a rotation of the first and second ear pieces with respect to a user's ears and the control circuitry can be configured to: (i) determine a rotation of the first ear piece relative to a user's ear based on the sensor data, (ii) detect and determine a swipe gesture input on the touch interface, and (iii) perform a predetermined function based on the swipe gesture input and the rotation of the first ear piece relative to the user's ear.

To better understand the nature and advantages of embodiments of the present disclosure, reference should be made to the following description and the accompanying figures. It is to be understood, however, that each of the figures is provided for the purpose of illustration only and is not intended as a definition of the limits of the scope of embodiments of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
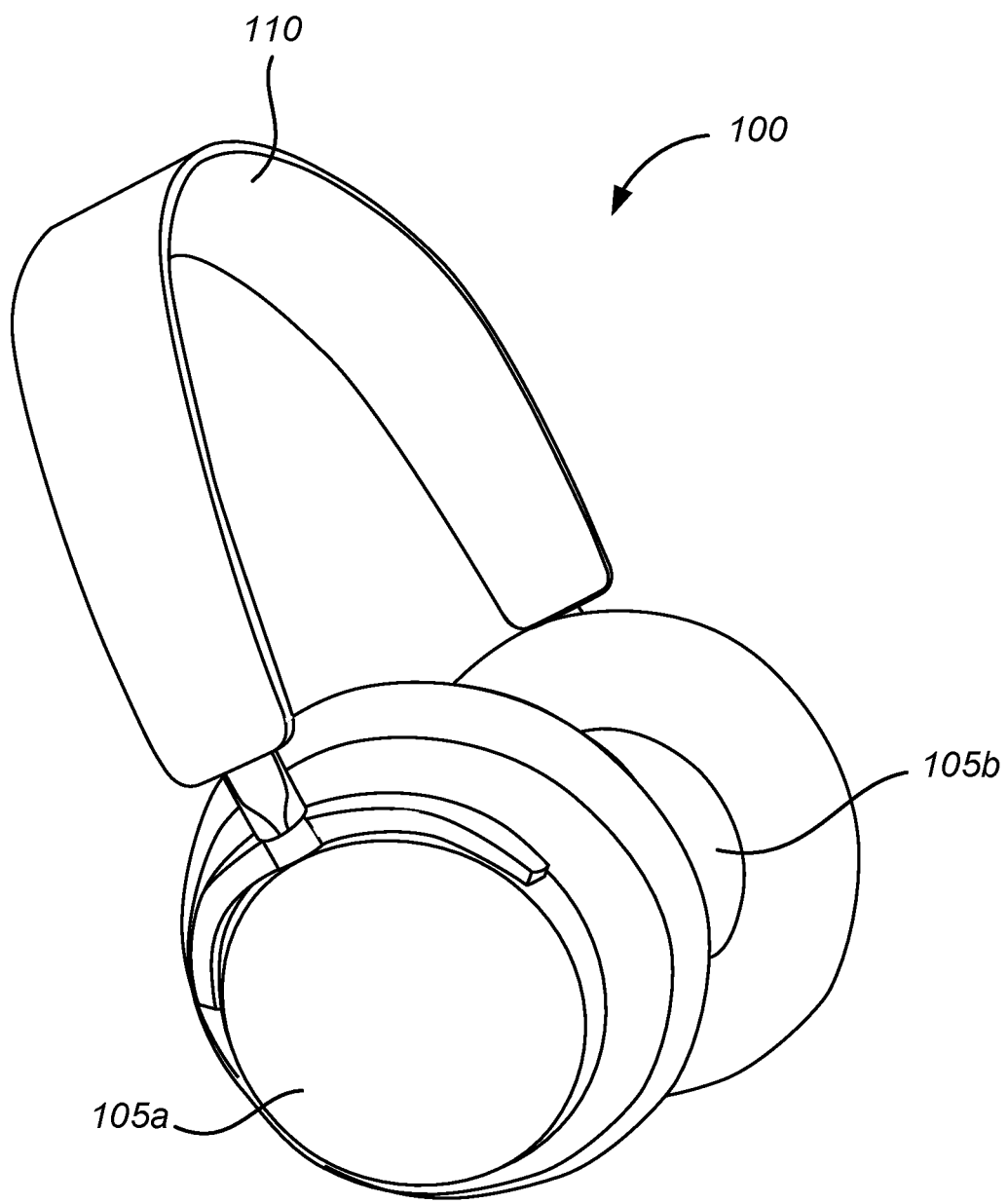
FIG. 1 shows a perspective view of a pair of headphones in accordance with some embodiments of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Reference is now made to FIG. 1, which depicts a perspective view of a pair of headphones 100 in accordance with some embodiments of the disclosure. Headphones 100 may be, for example, over-ear or on-ear headphones 100. Headphones 100 may be include a first ear piece 105a and a second ear piece 105b, interconnected by a headband 110. Each ear piece 105a, 105b may include a speaker. One of, or both of, ear pieces 105a, 105b can also include a touch interface 115 disposed at an external surface of the ear piece. Touch interface 115 can detect a user's touch at multiple locations of the interface and can be implanted using a variety of suitable technologies including capacitive technologies, resistive technologies and optical technologies, among others. In some embodiments, touch interface 115 can be a multi-touch interface that is able to recognize the presence of more than one or more than two points of contact with the surface.

One of, or both of, ear pieces 105a, 105 b can also include one or more sensors (not shown in FIG. 1) that generate sensor data that can be used to determine an orientation of headphones 100 on a user as described in detail. By determining how the headphones are being worn (i.e., the orientation of the headphones on a user's head), the headphones may be able to process directional input received by headphones 100, such as via the touch interface 115 on first ear piece 105a or second ear piece 105b, and/or via a touch interface (not shown) on headband 110, independent of headphone orientation. For simplicity, various internal components, such as the control circuitry and other components are not shown in FIG. 1.

Figure 2A:
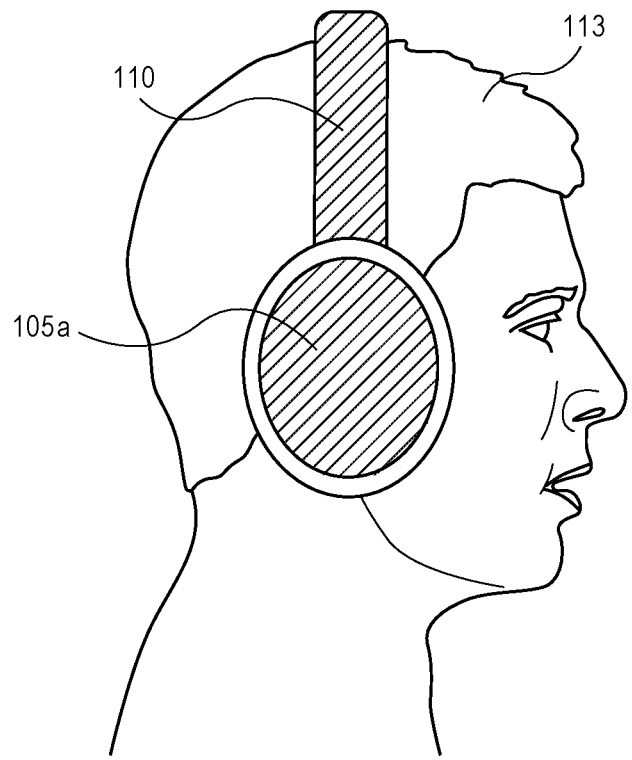
FIG. 2A shows a side view of a pair of headphones being worn by a user in an upright orientation in accordance with some embodiments of the disclosure.

FIG. 2A shows a side view of a pair of headphones 100 being worn on a user's head 113 in an upright orientation in accordance with some embodiments of the disclosure. As used herein, an "upright orientation" may be used to describe an orientation of the headphones 100 in which the headband 110 interconnects the first and second ear pieces 105a, 105b across the top of the head 113.

Figure 2B:
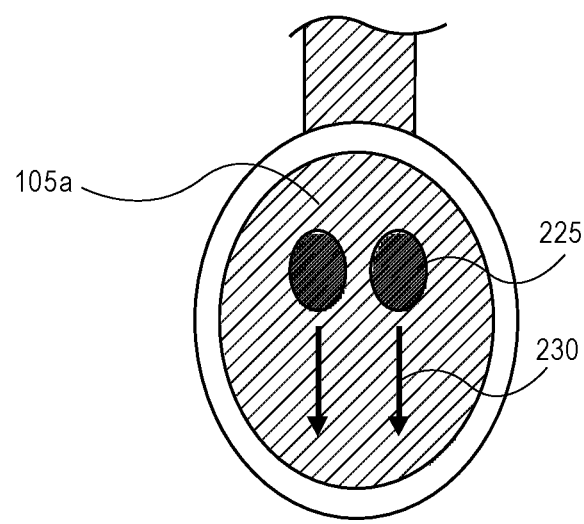
FIG. 2B shows a side view of an ear piece of a pair of headphones receiving a swipe gesture as user input in an upright orientation in accordance with some embodiments of the disclosure.

As shown in FIG. 2B, an ear piece 105a of a pair of headphones 100 may receive a multi-touch swipe gesture as user input in accordance with some embodiments of the disclosure. Although described herein with respect to multi-touch swipe gestures, it is contemplated that any type of gesture may be received as user input via the headphones 100 and that some gestures may be single touch gestures instead of multi-touch. In some embodiments, the gesture received as user input may be directional (e.g., from one point to another point, from top to bottom, from side to side, on an angle, etc.). In some embodiments, the gesture received as user input may be positional (e.g., at a certain point on the headphones 100, such as in the lower left hand corner of the ear piece 105a). In such embodiments, it may be beneficial to determine how the headphones 100 are rotated in order to properly process the user input.

As shown in FIG. 2B, which depicts an upright orientation of headphones 100, a multi-touch input gesture may be initially received. The multi-touch input gesture may be received as two touches on the touch interface at points 225. Although the gesture shown in FIG. 2B includes two points 225 at which touch input is received, it is contemplated that touch input may be received through a single point or through more than two points, for example, three or more points, and recognized as a gesture. Further, although shown at particular points 225, it is contemplated that the multi-touch input gesture may be received at any point(s) on the touch interface. The touch input may then move downward (i.e., toward the Earth), in an opposite direction than the headband 110, in direction 230, when in an upright orientation. As the touch input moves, the series of touch inputs generated by the movement may be referred to herein as a "gesture". The gesture may be processed by the headphones 100 in order to perform a predetermined function based on the direction 230 of movement of the touch input with respect to the upright orientation of the headphones 100 and the number of touch points (e.g., a single touch point (one finger) versus two touch points (two fingers) versus three touch points (three fingers), etc.). For example, the gesture illustrated in FIG. 2B may lower the volume of an audio signal being played from the speakers of the ear cups 105a, 105b.

Figure 3A:
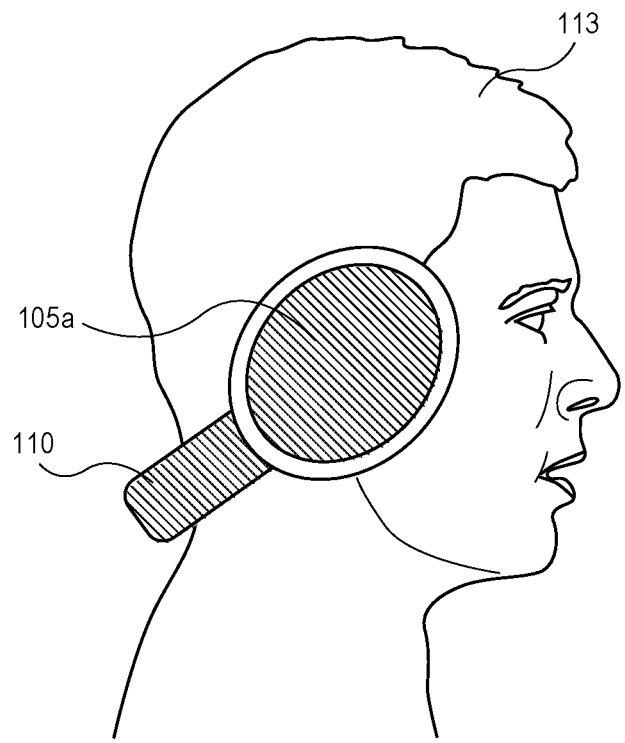
FIG. 3A shows a side view of a pair of headphones being worn by a user in a downward orientation in accordance with some embodiments of the disclosure.

FIG. 3A shows a side view of a pair of headphones 100 being worn on a user's head 113 in a downward orientation in accordance with some embodiments of the disclosure. As used herein, a "downward orientation" may be used to describe an orientation of the headphones 100 in which the headband 110 interconnects the first and second ear pieces 105a, 105b around the back of the user's neck. Although shown and described in FIGS. 2A and 3A as "upright" and "downward" orientations, it is contemplated that the headphones 100 may be positioned in any rotation and/or orientation between and/or beyond these two positions, such as having the headband 110 around the back of the head, having the headband 110 around the front of the head, and/or having the headband 110 around the front of the neck.

Figure 3B:
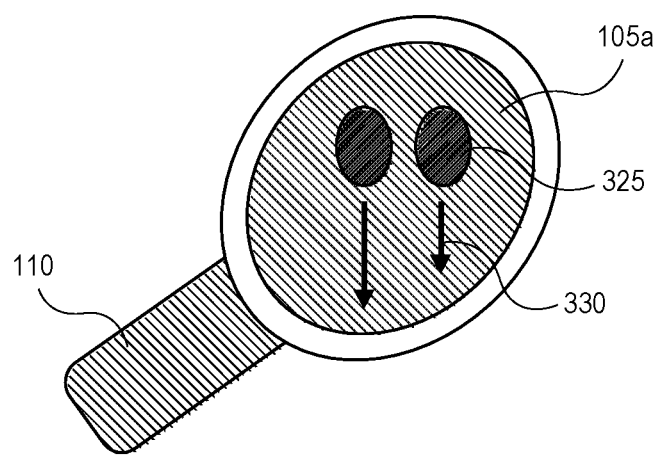
FIG. 3B shows a side view of an ear piece of a pair of headphones receiving a swipe gesture as user input in a downward orientation in accordance with some embodiments of the disclosure.

In the downward orientation shown in FIG. 3B, ear piece 105a may receive a swipe gesture as user input as described above with respect to FIG. 2B. Because of the different orientation of the headphones on the user, however, the downward swipe gesture shown in FIG. 3B will activate different portions of touch interface 115 than activated by the same downward swipe gesture shown in FIG. 2B. Embodiments of the disclosure can detect the gestures shown in FIGS. 2B and 3B as the same gesture that can then initiate the same action (e.g., lower headphone volume) regardless of the orientation of the headphones on the user. Thus, the interpretation and processing of the gestures in FIGS. 2B and 3B can be relative to the user as opposed to being relative to the headphones 100.

Figure 4:
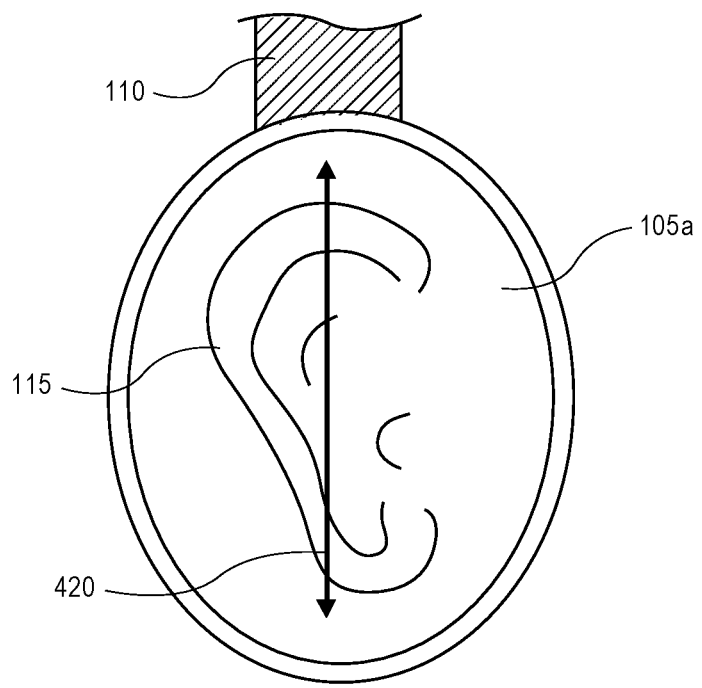
FIG. 4 shows a side view of an ear in an ear piece of a pair of headphones in an upright orientation in accordance with some embodiments of the disclosure.

The systems and methods described herein may perform any of a number of processes and/or analyses to determine the orientation of the headphones 100, and thus, the proper function to perform based on the directionality or position of the gesture. For example, some embodiments may perform recognition on an ear within an ear piece to determine what orientation the ear is in while the headphones 100 are being worn. FIG. 4 shows a side view of an ear 115 in an ear piece 105a of a pair of headphones 100 in an upright orientation in accordance with some embodiments of the disclosure. As shown in FIG. 4, the headphones 100 are in an upright orientation as indicated by the orientation 420 of ear 115 within the ear piece 105a (i.e., the orientation 420 of ear 115 is parallel to headband 110). Based on the orientation 420 of ear 115 within the ear piece 105a, directional or positional input may be processed with respect to the orientation 420 of ear 115. For example, a swipe gesture parallel to the orientation 420 of ear 115 may adjust the volume of an audio signal being played into the speaker of ear piece 105a.

Figure 5:
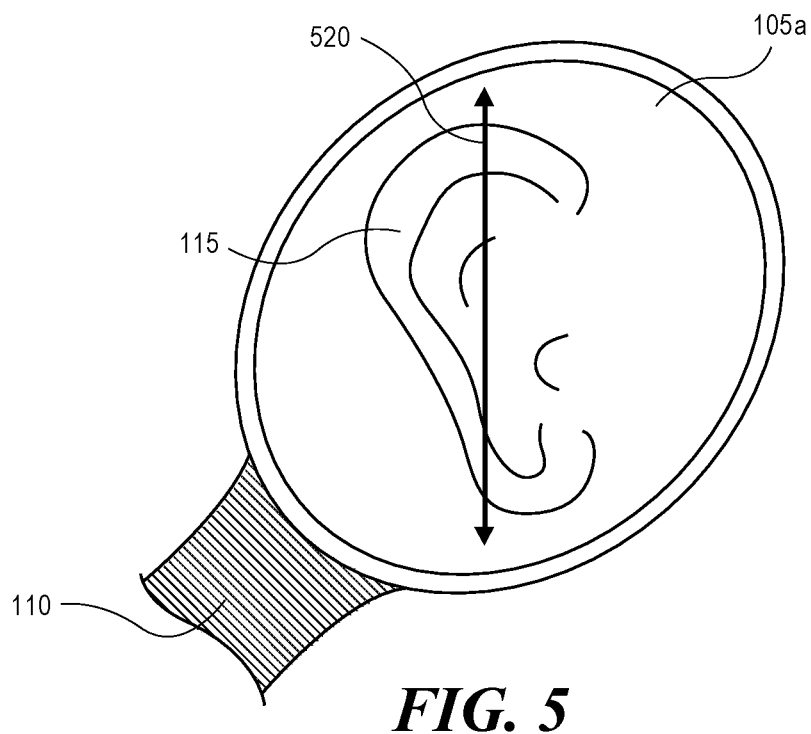
FIG. 5 shows a side view of an ear in an ear piece of a pair of headphones in a downward orientation in accordance with some embodiments of the disclosure.

FIG. 5 shows a side view of an ear 115 in an ear piece 105a of a pair of headphones 100 in a downward orientation in accordance with some embodiments of the disclosure. As shown in FIG. 5, the headphones 100 are in a downward orientation as indicated by the orientation 520 of ear 115 within the ear piece 105a (i.e., the orientation 520 of ear 115 is at an angle with respect to headband 110). Based on the orientation 520 of ear 115 within the ear piece 105a, directional or positional input may be processed with respect to the orientation 520 of ear 115. For example, a swipe gesture parallel to the orientation 520 of ear 115 (the same direction relative to the ear as orientation 420) can also adjust the volume of an audio signal being played into the speaker of ear piece 105a even though the swipe gesture parallel to orientation 520 represents movement of a user's fingers across touch interface 115 at different locations and in a different direction than the swipe gesture parallel to orientation 420 shown in FIG. 4. Thus, the interpretation and processing of the gesture in FIGS. 4 and 5 may be relative to the user as opposed to being relative to touch interface 115 of headphones 100.

Figure 6A:
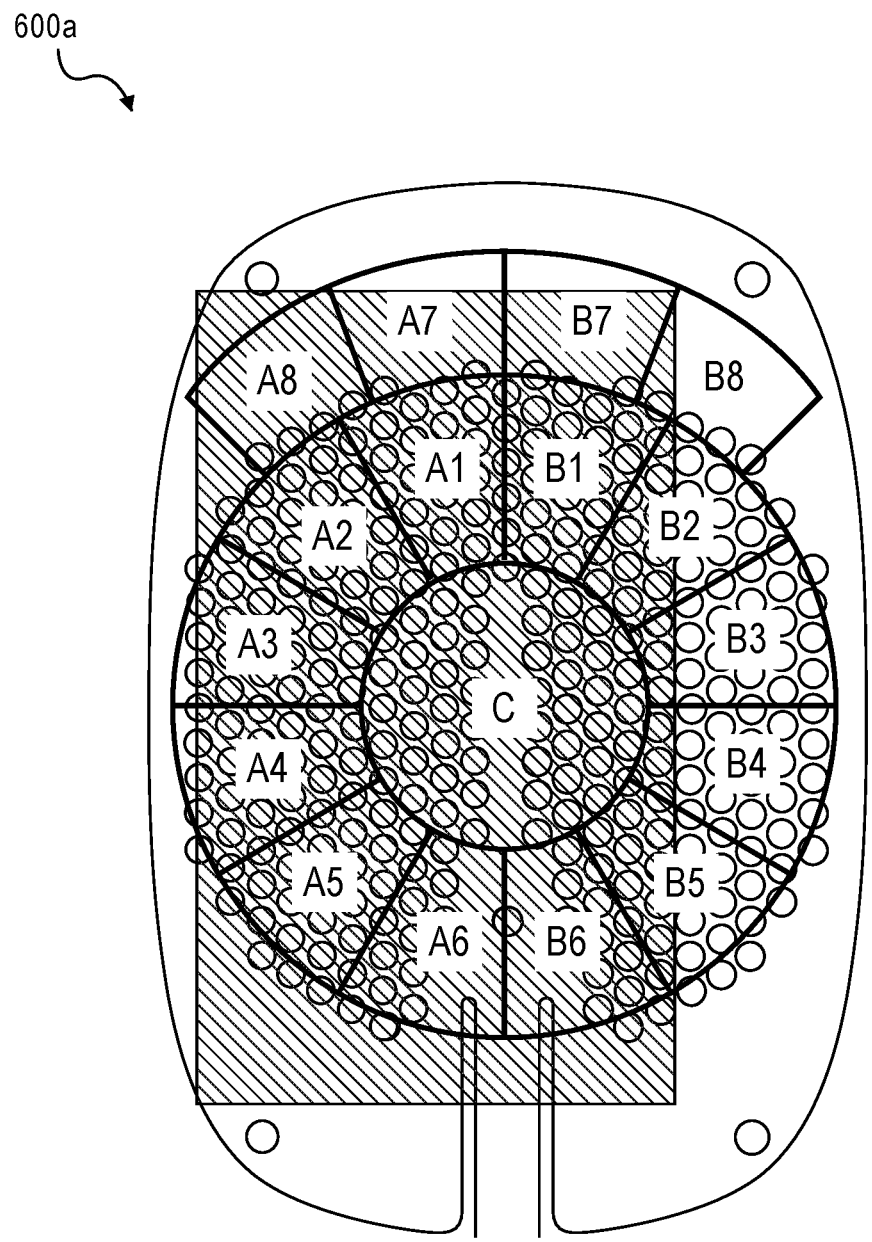
FIG. 6A shows a side view of an exemplary sensor array in accordance with some embodiments of the disclosure.
Figure 6B:
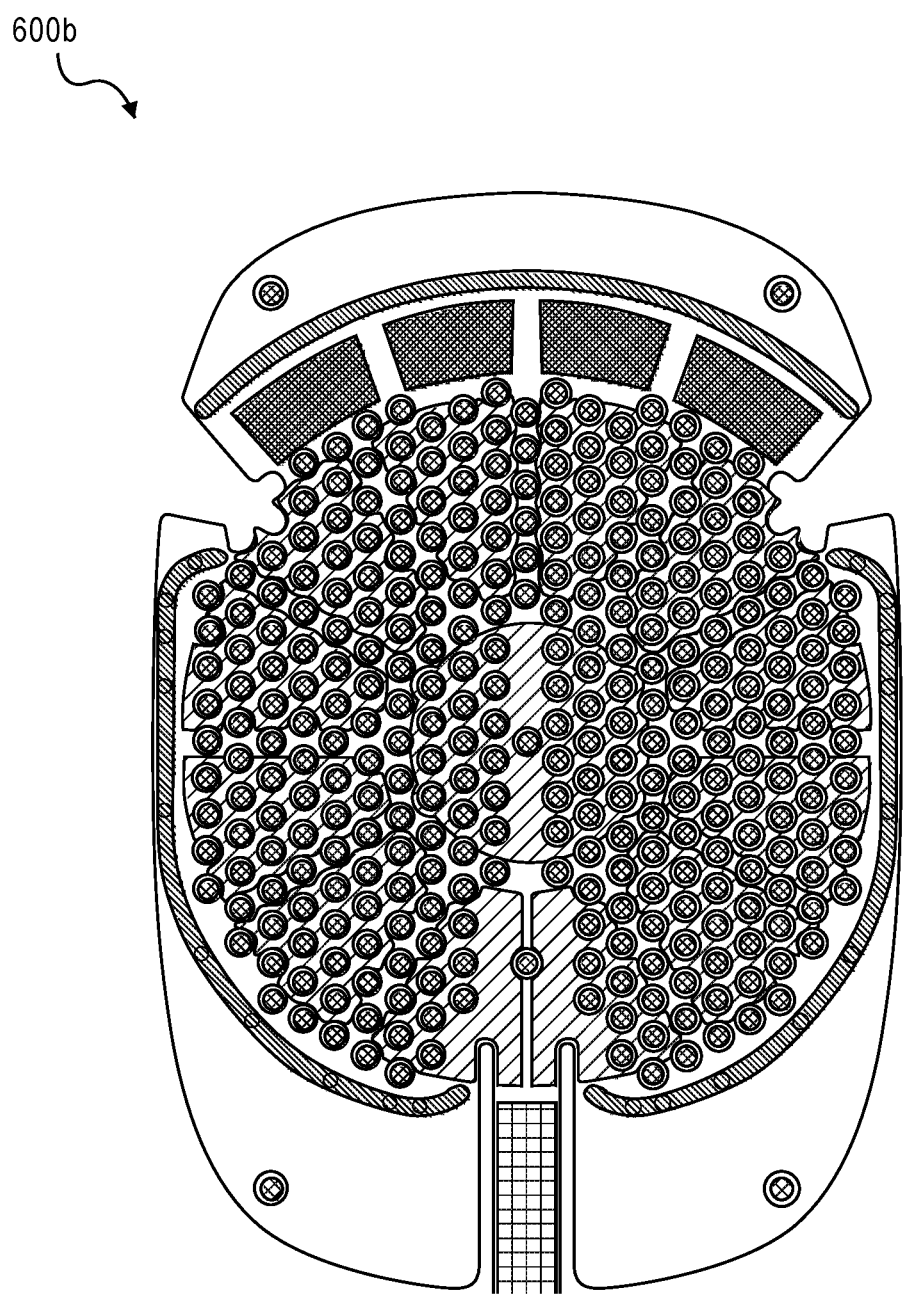
FIG. 6B shows a side view of another exemplary sensor array in accordance with some embodiments of the disclosure.

FIGS. 6A and 6B show side views of exemplary sensor arrays 600a, 600b that may be included in one or more ear pieces (e.g., ear piece 105a, ear piece 105b, etc.) in accordance with some embodiments of the disclosure. Sensor arrays 600a, 600b may include a plurality of sensors configured to detect a configuration or positioning of an ear within the ear piece. Exemplary sensors may include capacitive proximity sensors, optical sensors (e.g., infrared proximity sensors, one or more cameras, etc.), structured light sensors, and/or the like. In some embodiments, proximity sensors may measure the distance between the user's ear and the sensor. Sensor arrays 600a, 600b may collect data from the plurality of sensors that may be analyzed to identify features of the ear that are determinative of orientation of the ear. For example, sensor arrays 600a, 600b may collect data estimating the location of the pinna, the helix, the antihelix, the tragus, the antitragus, the concha, and/or the like. The sensor values may create a rough image of the ear which can be post-processed to determine the orientation of the ear relative to the sensor array 600a, 600b.

Figure 7:
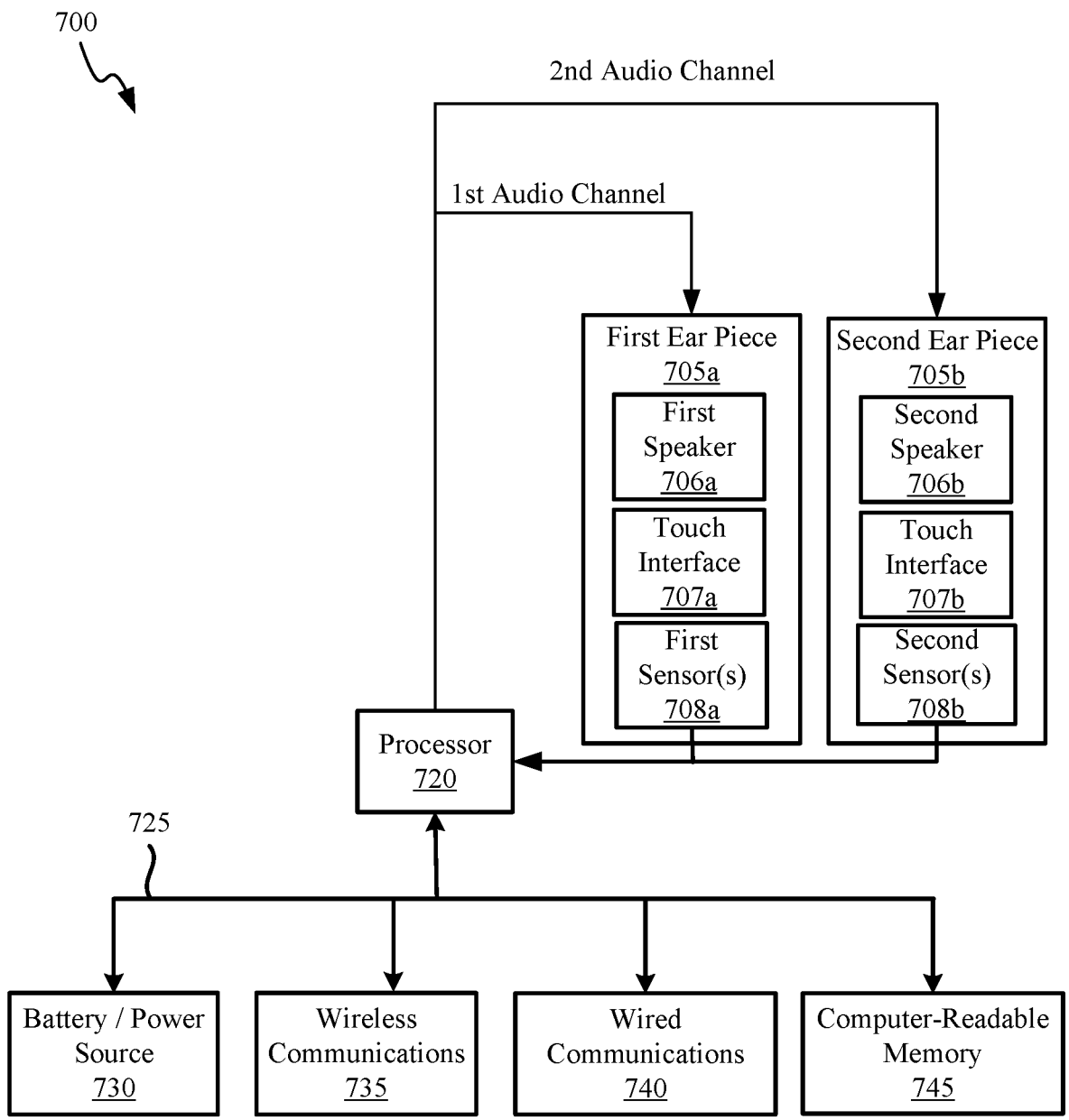
FIG. 7 shows a system level block diagram of a computing device that may be used to implement a pair of headphones in accordance with some embodiments of the disclosure.

FIG. 7 shows a system level block diagram of a computing device 700 that may be used to implement the various components described herein, in accordance with some embodiments of the disclosure. In particular, the detailed view illustrates various components that can be included in headphones 100. As shown in FIG. 7, the computing device 700 can include a processor 720 that represents a microprocessor or controller for controlling the overall operation of computing device 700. The computing device 700 can include first and second ear pieces 705a and 705b joined by a headband assembly. The first ear cup 705a may include a first speaker 706a and the second ear cup 705b may include a second speaker 706b for presenting media content to the user. Processor 720 can be configured to transmit first and second audio channel signals (e.g., a left channel audio signal and a right channel audio signal) to first and second ear cups 705a and 705b.

In some embodiments, touch interface 707a can be configured to transmit touch input received at first ear piece 705a to processor 720. Similarly, touch interface 707b can be configured to transmit touch input received at second ear piece 705b to processor 720. Processor 720 may be configured to process the touch input to perform a transformation on the left channel audio signal and/or the right channel audio signal in accordance with the information received from the touch interface 707a and/or the touch interface 707b. Although shown and described as having two touch interfaces 707a, 707b, it is contemplated in some embodiments, only one of first ear piece 705a or second ear piece 705b may have a touch interface. In some embodiments, neither first ear piece 705a nor second ear piece 705b may include a touch interface, and the touch interface may be alternatively included in a headband (not shown).

Processor 720 may further be configured to interpret the information received from the touch interface 707a and/or the touch interface 707b in accordance with data received from first sensor(s) 708a and/or second sensor(s) 707b. First sensor(s) 708a and/or second sensor(s) 707b may include capacitive proximity sensors, optical sensors (e.g., infrared proximity sensors, one or more cameras, etc.), structured light sensors, and/or the like. In some embodiments, first sensor(s) 708a and/or second sensor(s) 707b may measure the distance between the user's ear and the sensors. The data collected from the first sensor(s) 708a and/or second sensor(s) 707b may be analyzed to identify features of the ear that are determinative of orientation of the ear. Once the orientation of the ear is determined, it may be used to interpret touch input. Although shown and described as having sensors in both first ear piece 705a and second ear piece 705b, it is contemplated that sensors may be omitted from either of first ear piece 705a or second ear piece 705b. As used herein, processor 720 may also be referred to as "control circuitry".

A data bus 725 can facilitate data transfer between at least battery/power source 730, wireless communications circuitry 735, wired communications circuitry 740, computer readable memory 745, and processor 720. In some embodiments, processor 720 can be configured to instruct battery/power source 730 in accordance with information received by first and second touch interfaces 707a, 707b and/or first and second sensors 708a, 708b. Wireless communications circuitry 735 and wired communications circuitry 740 can be configured to provide media content to processor 720. In some embodiments, one or wireless communications circuitry 735 or wired communications circuitry 740 may be omitted. In some embodiments, processor 720, wireless communications circuitry 735 and wired communications circuitry 740 can be configured to transmit and receive information from computer-readable memory 745. Computer readable memory 745 can include a single disk or multiple disks (e.g. hard drives) and includes a storage management module that manages one or more partitions within computer readable memory 745.

Figure 8:
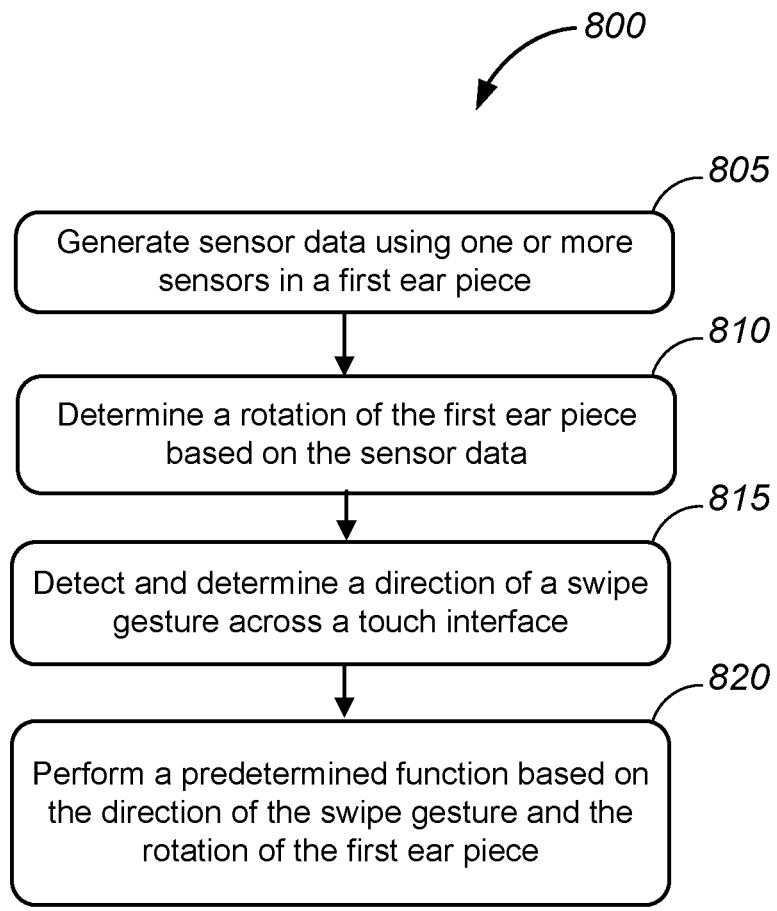
FIG. 8 shows a flowchart of a method for detecting rotation of a pair of headphones in accordance with some embodiments of the disclosure.

Reference is now made to FIG. 8, which depicts a flowchart 800 of a method for detecting rotation of a pair of headphones in accordance with some embodiments of the disclosure. At step 805, sensor data is generated using one or more sensors in a first ear piece. The one or more sensors may include capacitive proximity sensors in some embodiments. In some embodiments, the one or more sensors may be distributed across a surface of the first ear piece facing the user's ear. In some embodiments, the one or more sensors may include a sensor element that measures a distance between the user and the sensor element. In some embodiments, the one or more sensors includes an optical sensor. In some embodiments, the one or more sensors may include a structured light sensor.

At step 810, a rotation of the first ear piece relative to a user's ear is determined based on the sensor data. For example, the sensor data may generate a rough image of the user's ear. The image may be analyzed and processed in order to determine one or more identifiable features of the ear, such as the pinna. The placement and/or orientation of the pinna in the image with respect to the placement of the sensors capturing the image in the first ear piece may determine the rotation of the first ear piece relative to the user's ear.

At step 815, a direction of a touch input on a touch interface of the first ear piece is detected and determined. The touch interface may allow the external surface (i.e., the surface facing away from the ear) of the first ear piece to recognize the presence of one or more points of contact with the touch interface. The touch interface may implement, for example, capacitive technologies (e.g., surface capacitive technology, near field imaging, projected capacitive touch, in-cell capacitive technology, etc.), resistive technologies (e.g., analog resistive, digital resistive, etc.), optical technologies (e.g., optical imaging, infrared technology, rear diffused illumination, laser light plane, in cell optical, etc.), and/or wave technologies (e.g., surface acoustic wave, bending wave touch, force-sensing touch technology, etc.) in order to detect the presence of a touch input on the first ear piece. In some embodiments, the touch input may be positional touch input. For example, for touch input desired to be placed in a particular corner of the ear piece, the corners may be dynamic based on the rotation of the ear piece. In other words, the function associated with touching each corner may be different based on the rotation of the ear piece, as described further herein. In some embodiments, the touch input may be a gesture. In some embodiments, the touch input may be a swipe gesture. In some embodiments, the direction of the swipe gesture may be determined based upon the movement of the gesture on the touch interface. In embodiments in which both the first and second ear pieces include a touch interface, the touch input can be detected from either or both ear pieces.

At step 820, a predetermined function may be performed based on the touch input and the rotation of the first ear piece relative to the user's ear. For example, the direction of the swipe gesture with respect to the user (as opposed to the headphones) may be determined and analyzed in order to perform a selected function associated with that gesture. In another example, the position of the swipe gesture with respect to the user (as opposed to with respect to the headphones) may be determined and analyzed in order to perform a selected function associated with that positional touch input. Exemplary functions that may be controlled by touch input may include stopping playback of an audio signal, starting playback of an audio signal, pausing playback of an audio signal, rewinding an audio signal, fast forwarding an audio signal, increasing volume of an audio signal, decreasing volume of an audio signal, increasing or decreasing treble of an audio signal, increasing or decreasing bass of an audio signal, connecting to or disconnecting from a particular source device, etc.

Some embodiments of the disclosure may account for various factors in determining the orientation of the headphones with respect to the ear. For example, some embodiments may account for hair covering the ear, accessories (e.g., earrings, glasses, etc.), a range of head sizes, different ear positions, a range of ear sizes, a range of ear shapes, motion (e.g., running, bobbing, sit ups, yoga, etc.), leaning back, lying down (e.g., on back, on side, on stomach, etc.), hats, clothing covering at least a portion of the ear (e.g., a hoodie), single ear behavior (e.g., lifting off one ear), and/or accessibility (e.g., malformed ears, at least partially missing ears, hearing aids, etc.). Some embodiments of the disclosure may also determine that headphones are not being worn on an ear in various circumstances, such as when the headphones are in a bag, in a car, in a box or case, on a table, on a stand, on a dummy, on a chair, on an armrest, being held, being examined, being worn over the neck, being worn on the head but not on the ears (e.g., on cheeks, on back of head, etc.), and/or DJ mode (e.g., held to one ear with the other side free).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A pair of headphones comprising:
a first ear piece including a first speaker and a touch interface disposed at an external surface of the first ear piece;
a second ear piece including a second speaker;
a headband extending between the first and second ear pieces;
one or more sensors that generate sensor data; and
control circuitry coupled to the one or more sensors and to the touch interface and configured to: (i) determine an orientation of a user's ear within the first ear piece based on the sensor data, (ii) detect a touch input on the touch interface, (iii) determine the touch input based on the orientation of the user's ear with respect to the first earpiece, and (iv) adjust playback of an audio signal by the pair of headphones based on the determined orientation of the user's ear within the first ear piece and the determined touch input.

2. The pair of headphones of claim 1 wherein adjusting playback of the audio signal comprises one or more of stopping playback, starting playback, pausing playback of the audio signal, rewinding the audio signal, fast forwarding the audio signal, increasing volume of the audio signal, decreasing volume of the audio signal, increasing or decreasing treble of the audio signal, increasing or decreasing bass of the audio signal.

3. The pair of headphones of claim 1 wherein the touch input includes a gesture.

4. The pair of headphones of claim 3 wherein the gesture is a swipe gesture.

5. The pair of headphones of claim 1 wherein the control circuitry determines the orientation of the user's ear within the first ear piece based on an orientation of a pinna of the ear relative to the first ear piece.

6. The pair of headphones of claim 5 wherein the one or more sensors comprises a plurality of capacitive proximity sensors.

7. The pair of headphones of claim 6 wherein the plurality of capacitive proximity sensors is distributed across a surface of the first ear piece facing the user's ear and wherein each sensor of the one or more sensors includes a sensor element that measures a distance between the user and the sensor element.

8. The pair of headphones of claim 5 wherein the one or more sensors comprises an optical sensor.

9. The pair of headphones of claim 5 wherein the one or more sensors comprises a structured light sensor.

10. The pair of headphones of claim 1 wherein the touch interface disposed at an external surface of the first ear piece comprises a multi-touch interface that is able to recognize the presence of more than one point of contact with the external surface.

11. The pair of headphones of claim 1 wherein the second ear piece further includes a touch interface disposed at an external surface of the second ear piece.

12. A pair of headphones comprising:
a first ear piece including a first speaker and a touch interface disposed at an external surface of the first ear piece;
a second ear piece including a second speaker;
a headband extending between the first and second ear pieces;
one or more sensors that generate sensor data; and
control circuitry coupled to the one or more sensors and to the touch interface and configured to: (i) determine an orientation of a user's ear within the first earpiece based on the sensor data, (ii) detect a gesture input on the touch interface, (iii) determine the gesture input based on the orientation of the user's ear with respect to the first earpiece, and (iv) adjust playback of an audio signal by the pair of headphones based on the determined gesture input.

13. The pair of headphones of claim 12 wherein, when the gesture input is a downward swipe in a direction from the user's scalp towards the user's neck, the gesture input activates different locations of the touch interface based on an orientation in which the pair of headphones is worn on the user's head.

14. The pair of headphones of claim 12 wherein, when the gesture input is a downward swipe in a direction from the user's scalp towards the user's neck, the control circuitry is configured to adjust playback of the audio signal in the same manner irrespective of an orientation in which the pair of headphones is worn on the user's head.

15. The pair of headphones of claim 12 wherein the second ear piece further includes a multi-touch interface disposed at an external surface of the second ear piece that is able to recognize the presence of more than one point of contact with the external surface.

16. The pair of headphones of claim 12 wherein the control circuitry is configured to determine the orientation of the first ear piece relative to the user's ear based on an orientation of a pinna of the ear relative to the first ear piece.

17. The pair of headphones of claim 12 wherein the one or more sensors comprises a plurality of capacitive proximity sensors.

18. The pair of headphones of claim 17 wherein the plurality of capacitive proximity sensors is distributed across a surface of the first ear piece facing the user's ear and wherein each sensor of the one or more sensors includes a sensor element that measures a distance between the user and the sensor element.

19. The pair of headphones of claim 12 wherein the sensor data represents a rough image of the user's ear and the control circuitry is configured to determine one or more identifiable features of the ear from the sensor data.

* * * * *